US011762723B2

(12) United States Patent
Long et al.

(10) Patent No.: US 11,762,723 B2
(45) Date of Patent: Sep. 19, 2023

(54) SYSTEMS AND METHODS FOR APPLICATION OPERATIONAL MONITORING

(71) Applicant: JPMORGAN CHASE BANK, N.A., New York, NY (US)

(72) Inventors: Ken Long, Bournemouth (GB); Salwa Husam Alamir, London (GB); Indrajit Naskar, London (GB); Kunal Uskaikar, Columbus, OH (US); Parankush Chunchu, Secunderabad (IN); A V Rajath, Bengaluru (IN); Sneha Bindeshwar Prasad, Bangalore (IN); Preeti Udas, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/321,610

(22) Filed: May 17, 2021

(65) Prior Publication Data
US 2021/0357280 A1 Nov. 18, 2021

(30) Foreign Application Priority Data
May 17, 2020 (IN) .............................. 202011020777

(51) Int. Cl.
*G06F 11/07* (2006.01)
*G06F 11/32* (2006.01)
*G06F 11/30* (2006.01)

(52) U.S. Cl.
CPC .......... *G06F 11/076* (2013.01); *G06F 11/302* (2013.01); *G06F 11/3075* (2013.01); *G06F 11/328* (2013.01)

(58) Field of Classification Search
CPC .. G06F 11/076; G06F 11/302; G06F 11/3075; G06F 11/328; G06F 11/3433;
(Continued)

(56) References Cited

U.S. PATENT DOCUMENTS 11,212,195 B1 * 12/2021 Tamir .................... G06F 9/5072
11,240,127 B1 * 2/2022 Hevenor ............. H04L 41/0681
(Continued)

*Primary Examiner* — James C Kerveros
(74) *Attorney, Agent, or Firm* — GREENBERG TRAURIG LLP

(57) ABSTRACT

A method for application operational monitoring may include an operational monitoring computer program: (1) ingesting a plurality of service level indicator (SLI) metrics for an application, each SLI metric identifying a number of successful observations and a number of total observations; (2) calculating a SLI score for each SLI metric based on the number of successful observations and the number of total observations for the SLI metric; (3) weighting the SLI score for each SLI metric; (4) combining the weighted SLI scores into an application SLI score; (5) calculating a calculated error budget based on the application SLI score; (6) determining that the calculated error budget exceeds an error budget for the application; (7) generating a notification in response to the calculated error budget breaching the error budget; and (8) causing implementation of a restriction on the application, wherein the restriction prevents enhancements to the application.

14 Claims, 2 Drawing Sheets

(58) Field of Classification Search
CPC .......... G06F 11/3442; G06F 2201/865; G06F 11/3452
USPC ...................................................... 714/704
See application file for complete search history.

(56) References Cited

U.S. PATENT DOCUMENTS

| | | | |
|---|---|---|---|
| 11,250,069 B1* | 2/2022 | Bianchi | ................. G06F 16/904 |
| 2020/0366569 A1* | 11/2020 | White | ................. H04L 41/5009 |

* cited by examiner

SYSTEMS AND METHODS FOR APPLICATION OPERATIONAL MONITORING

RELATED APPLICATIONS

This application claims priority to, and the benefit of, Indian Patent Application Ser. No. 202011020777, filed May 17, 2020, the disclosure of which is hereby incorporated, by reference, in its entirety.

BACKGROUND OF THE INVENTION

1. Field of the Invention

Embodiments relate generally to systems and methods for application operational tracking.

2. Description of the Related Art

There is no simple way for technology or business teams to know quantitatively if their application or service is working or not, making it difficult to consistently determine where technology and support teams should focus efforts. For example, if an application is working as expected, teams can focus on adding new features; if the application is not working as expected, the teams should focus on addressing the problems. The determination of whether an application is working as expected is subjective and can cause conflicts between the business team and the technology team.

SUMMARY OF THE INVENTION

Systems and methods for application operational tracking are disclosed. In one embodiment, a method for application operational monitoring may include: (1) ingesting, at an operational monitoring computer program, a plurality of service level indicator (SLI) metrics for an application comprising synthetic SLI metrics and Application Performance Monitoring (APM)/Application Programmable Interface (API) SLI metrics, each SLI metric identifying a number of successful observations and a number of total observations; (2) calculating, by the operational monitoring computer program, a SLI score for each SLI metric based on the number of successful observations and the number of total observations for the SLI metric; (3) weighting, by the operational monitoring computer program, the SLI score for each SLI metric; (4) combining, by the operational monitoring computer program, the weighted SLI scores into an application SLI score; (5) calculating, by the operational monitoring computer program, a calculated error budget based on the application SLI score; (6) determining, by the operational monitoring computer program, that the calculated error budget exceeds an error budget for the application; (7) generating, by the operational monitoring computer program, a notification in response to the calculated error budget breaching the error budget; and (8) causing, by the operational monitoring computer program, implementation of a restriction on the application, wherein the restriction prevents enhancements to the application.

In one embodiment, the method may further include calculating, the operational monitoring computer program, the error budget based on a service level objective (SLO) for the application.

In one embodiment, the error budget may be based on the number of total observations.

In one embodiment, the notification may include a SLO status.

In one embodiment, the restriction may be implemented in an integrated deployment toolchain/pipeline.

In one embodiment, the method may further include causing, by the operational monitoring computer program, the restriction to be removed in response to the calculated error budget being within the error budget.

In one embodiment, the method may further include updating, by the operational monitoring computer program, the error budget based at least one prior calculated error budget for the application.

According to another embodiment, an electronic device may include a computer processor and a memory comprising an operational monitoring computer program. The operational monitoring computer program may be configured to: ingest a plurality of service level indicator (SLI) metrics for an application comprising synthetic SLI metrics and Application Performance Monitoring (APM)/Application Programmable Interface (API) SLI metrics, each SLI metric identifying a number of successful observations and a number of total observations; calculate a SLI score for each SLI metric based on the number of successful observations and the number of total observations for the SLI metric; weight the SLI score for each SLI metric; combine the weighted SLI scores into an application SLI score; calculate a calculated error budget based on the application SLI score; determine that the calculated error budget exceeds an error budget for the application; generate a notification in response to the calculated error budget breaching the error budget; and cause implementation of a restriction on the application, wherein the restriction prevents enhancements to the application.

In one embodiment, the operational monitoring computer program may be further configured to calculate the error budget based on a service level objective (SLO) for the application.

In one embodiment, the error budget may be based on the number of total observations.

In one embodiment, the notification may include a SLO status.

In one embodiment, the restriction may be implemented in an integrated deployment toolchain/pipeline.

In one embodiment, the operational monitoring computer program may be further configured to cause the restriction to be removed in response to the calculated error budget being within the error budget.

In one embodiment, the operational monitoring computer program may be further configured to update the error budget based on at least one prior calculated error budget for the application.

According to another embodiment, a system may include: an application; a monitoring broker application that receives plurality of service level indicator (SLI) metrics comprising synthetic SLI metrics and Application Performance Monitoring (APM)/Application Programmable Interface (API) SLI metrics from the application and makes them available on a telemetry bus, each SLI metric identifying a number of successful observations and a number of total observations; and an operational monitoring engine comprising a computer processor and executing an operational monitoring computer program that receives the plurality of SLI metrics from the telemetry bus and may be configured to: ingest the SLI metrics; calculate a SLI score for each SLI metric based on the number of successful observations and the number of total observations for the SLI metric; weight the SLI score for each SLI metric; combine the weighted SLI scores into an application SLI score; calculate a calculated error budget based on the application SLI score; determine that the calculated error budget exceeds an error budget for the application; generate a notification in response to the calculated error budget breaching the error budget; and cause implementation of a restriction on the application, wherein the restriction prevents enhancements to the application.

In one embodiment, the operational monitoring computer program may be further configured to calculate the error budget based on a service level objective (SLO) for the application, wherein the error budget may be based on the number of total observations.

In one embodiment, the notification may include a SLO status.

In one embodiment, the system may further include an integrated deployment toolchain/pipeline, wherein the restriction may be implemented in the integrated deployment toolchain/pipeline.

In one embodiment, the operational monitoring computer program may be further configured to cause the restriction to be removed in response to the calculated error budget being within the error budget.

In one embodiment, the operational monitoring computer program may be further configured to update the error budget based on at least one prior calculated error budget for the application.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for application operational tracking.

Embodiments may use application operational metrics to assist business and development teams to make better and more consistent decisions around the work they do.

Embodiments may capture and perform a statistical analysis of key metrics associated with an application or service to provide a simple measure of how well the application or service is working. Embodiments provide an "Error Budget," which gives a measure of the amount of headroom that exists before the application is deemed not working.

The error budget may be expressed as a percentage and allows data to drive the decision around where the team should focus its efforts. For example, if the error budget is positive (i.e., the team has some error budget remaining) the application may be deemed to be working as expected, and the team can focus on adding new features to the application, performing other work, etc. If, however, the error budget is negative, the application may be deemed to not be working as expected, and the team should focus on addressing application stability.

In embodiments, the business and technology teams may agree to an "Error Budget Policy" that may outline the action(s) to be taken when the error budget for an application is exhausted. The end-user may define and submit the policy in a user interface, and then the policy may be approved via an approval queue by responsible parties (e.g., application owner, product owner, etc.). Once the Error Budget Policy is approved, all SLIs associated with the application move from a "Draft" state to a "Live" state. Once the error budget policy and SLIs are "Live," any edits to the SLI configuration (e.g., threshold, SLI window, etc.) may spawn an approval request to be accepted by responsible parties before those changes are applied. If the responsible parties do not approve the changes, the changes are not implemented.

Embodiments may provide transparency and awareness of how well an application is working, may align the objectives of the technology and business teams when the error budget is positive or negative, etc.

Figure 1:
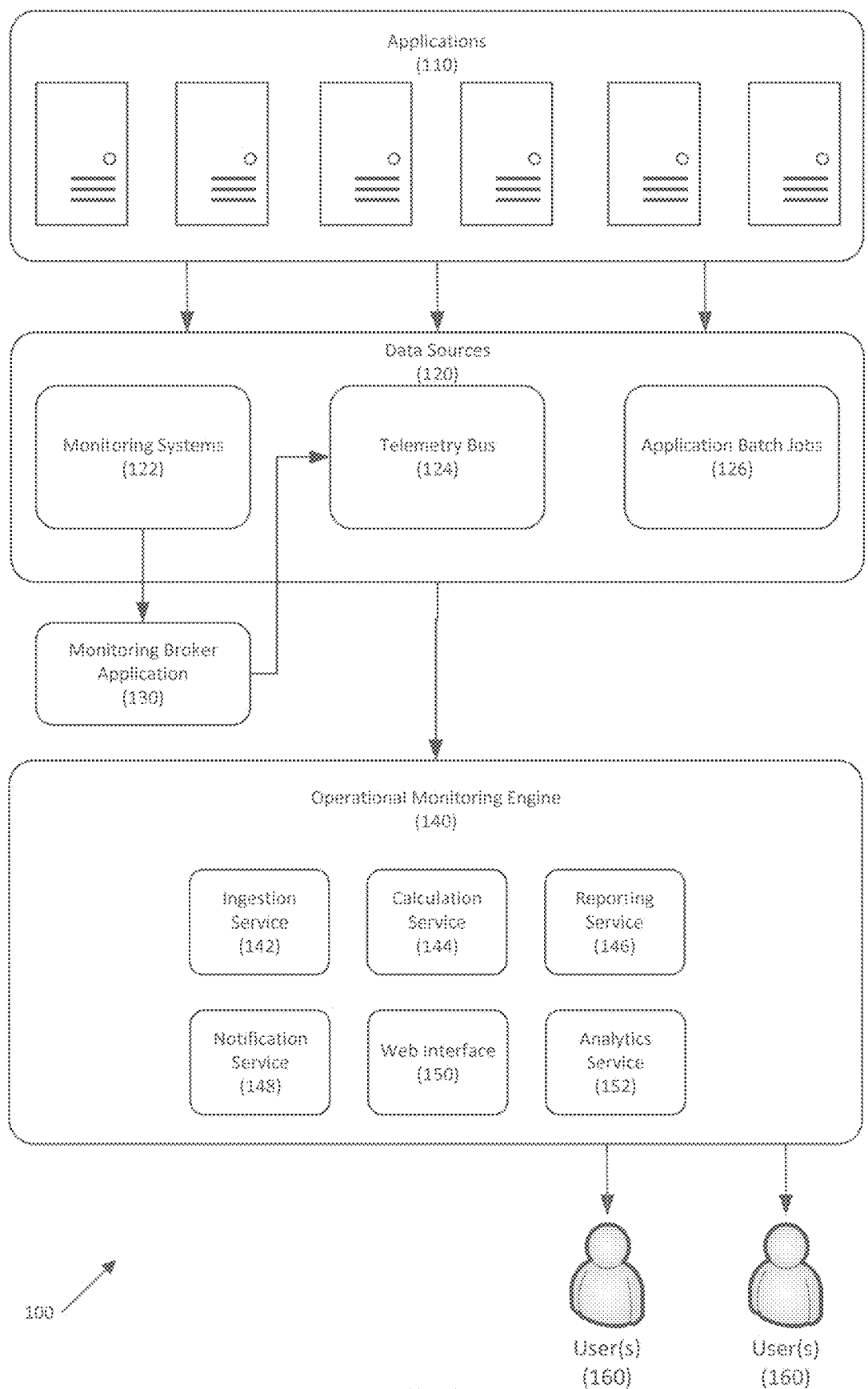
FIG. 1 depicts a system for application operational tracking according to one embodiment.

Referring to FIG. 1, a system for application operational monitoring is provided according to one embodiment. System 100 may include a plurality of applications 110, a plurality of data sources 120, monitoring broker application 130, operational monitoring engine 140, and users 160.

In one embodiment, applications 110 may be any suitable applications.

In one embodiment, data sources may include application monitoring systems 122, telemetry bus 124, such as a Kafka bus, and application batch jobs 126.

Examples of application monitoring systems 122 include APICA and APP Dynamics. Telemetry bus 124 may include Broadsword, Geneos, and Splunk.

In one embodiment, monitoring broker application 130 pull a plurality of SLI metrics from monitoring systems 122, such as APICA and App Dynamics. It may then post the SLI metrics to ingestion service 142, where they may be ingested.

In embodiments, a plurality of types of SLI metrics may be used to monitor an application. For example, a combination of synthetic SLI metrics that automatically run on scheduled intervals (e.g., every 5 minutes) and Application Performance Monitoring (APM)/Application Programmable Interface (API) SLI metrics that incur when real users or real batch jobs are executing work on the system may be used. By using both types of SLI metrics, embodiments may ensure that the service level is compliant both when the system is active (e.g., users on the system) and when the system is dormant (e.g., Saturday at 1 am).

Each SLI metric and/or each SLI metric type can be weighted 0%-100% within the calculation for flexibility of applications that are more sensitive to performance (e.g., higher weighting) versus application errors (e.g., lower weighting). Depending on each application's business and user agreements, application owners may configure the weightings on the SLIs to calculate the values, which allows the tool to be flexible and targeted.

In another embodiment, the risk weightings may be determined and/or revised based on historical SLI metrics.

In another embodiment, monitoring broker application 130 may pull a plurality of SLI metrics from monitoring systems 122, such as APICA and App Dynamics. It may then post the SLI metrics to telemetry bus 124 which may be then ingested by ingestion service 142. In one embodiment, monitoring broker application 130 may be an API or similar.

Operational monitoring engine 140 may include a plurality of microservices, including ingestion service 142, calculation service 144, reporting service 146, notification service 148, web interface 150, and analytics service 152. Each of these microservices may be a computer program executed on an electronic device, such as a server (physical and cloud-based), workstation, etc.

In one embodiment, ingestion service 142 may pull the plurality of SLI metrics from telemetry bus 124. Application batch jobs 126 may post SLI metrics directly to ingestion service 142.

Calculation service 144 may run calculations on SLI metrics and may generate a SLI score for the application based on SLI metrics. Each SLI metric may have an accepted threshold—if the threshold is breached that observation is considered a failed observation. If the metric value is within the threshold it is considered a successful observation (this does not count against error budget). The SLI score may be a ratio of the number of successful observations over the total number of observations over a configurable SLI window which may be based on time (e.g., 30 days), number of observations or datapoints (e.g., 500 observations) depending upon the configured weightage.

In one embodiment, the responsible party for the application may register each metric as an SLI at web interface 150. Calculation service 144 may evaluate the history of that metric and choose a machine-learned suitable threshold upon onboarding instead of the user guessing the threshold or user leaving the default thresholds in place. In one embodiment, if the user registers a threshold that is anomalous, embodiments may notify the user and may recommend a better threshold for the SLI.

Calculation service 144 may calculate a calculated error budget based on the difference between an aggregation of the calculated SLI metric and a service level objective (SLO) for the application. The SLO and/or the error budget for the application may be received at web interface 150, may be determined from a Service Level Agreement (SLA), etc. In one embodiment, the error budget for the application may be determined and/or revised based on historical calculated error budgets. Thus, if the error budget is not breached, it may be modified (e.g., reduced).

An example calculation is as follows:

| Availability SLO Requirement | Availability SLI Calculation | SLI Calculation |
|---|---|---|
| Amount of uptime expected in 30-day window: 98% | #Successful observations/#Total Observations 8467/8650 = 98% | (#Total Obs. − #Failed Obs)/#Total Obs (8650 − 183)/8650 = 98% |

Thus, in the example above, the error budget is 183 (the number of failed observations available for 8650 total observations to maintain the 98% SLO requirement.

In one embodiment, the error budget may be expressed as a function of time. For example, the error budget may be expressed as a percent of availability for a certain period of time (e.g., 99.95% availability over 30 days), a number of errors, defects, or issues in a certain period of time (e.g., 100 defects/month), or in any other suitable manner.

Reporting service 146 may make the calculations and comparisons available to users 160. Users 160 may receive notifications when, for example, a threshold is breached, when the SLO is breached, when the error budget is within a certain amount of being completely used, etc. In one embodiment, the notifications may be by email, in-app notifications, etc.

Users 160 may configure parameters via web interface 150. For example, users 160 may identity the parameters to collect, may set times where any threshold/SLO breaches should be ignored (e.g., on the weekend), may identify the error budget for each application or for a plurality of applications, the SLO, etc. In one embodiment, the user may provide a SLA and the SLO may be identified using natural language processing.

In one embodiment, operational monitoring engine 140 may control use or access to applications based on whether a threshold/SLO has been breached, or whether the error budget is within a certain amount of being used. For example, calculation service 144 may derive the "status" of the SLI compared to the SLO, and reporting service 146 may expose a real-time SLO status via RESTful API, such as GET SLO_Status for AppID=12345. SLO_Status may return a status, such as a green status (e.g., SLI within SLO), amber (e.g., SLI % dips below a SLO warning threshold), and a red status (e.g., SLI % dips below SLO Breach). Other statuses may be used as is necessary and/or desired.

In one embodiment, operational monitoring engine 140 may cause a restriction on the application to be implemented. An example of a restriction is a tollgate that prevents enhancements on any breaching application until the issue(s) with the application are resolved, or when the application is no longer in breach of the error budget and/or SLO. For example, the tollgate may be implemented in the integrated deployment toolchain/pipeline that manages code scans, validates testing coverage, etc. for the application. The tollgate may query reporting service 146 for the SLO status as part of the application validation process.

The restriction may further prevent the application from executing the operation (e.g., run a batch job) that may have caused the SLO to be breached.

In one embodiment, the restriction may allow automation to the application, the deployment of additional resources (e.g., additional compute, memory, storage, etc.).

Users 160 may receive notifications via notification service 148 and may interface with operational monitoring engine 140 via web interface 150.

Embodiments may programmatically evaluate and detect existing thresholds that are extremely high or extremely low given the calculated SLI metrics using pattern detection. For example, analytics service 152 may cache the history of a selected threshold or metric for pattern analysis.

Notification service 148 may notify the user to define to a more realistic threshold value to determine pass versus fail observations. In another embodiment, pattern detection may be used to identify patterns for the raw metric itself. If a metric spikes or dips and maintains this spike/dip for a consistent duration (e.g., 1 week/1 month), the SLI may be flagged and notification service 148 may notify the user of potential issue with the service level of the system, that a threshold change may be necessary, etc.

Embodiments may further detect inconsistencies. For example, operational monitoring engine 140 may monitor a ticketing system and if the application or service had high severity incidents logged against it and the SLI never dropped, notification service 148 may notify the user that additional SLI metric definitions, adjustments to the current SLI configuration, etc. may be needed. For example, operational monitoring engine 140 may interface with an information technology system, such as a ticketing, incident, and change source system (not shown) and may receive ticket data/history from this feed. The ticket data/history may be provided with an application or component identifier and may map the history of tickets alongside SLI %, or analytics service 152 may run analytics of tickets versus SLI %.

Figure 2:
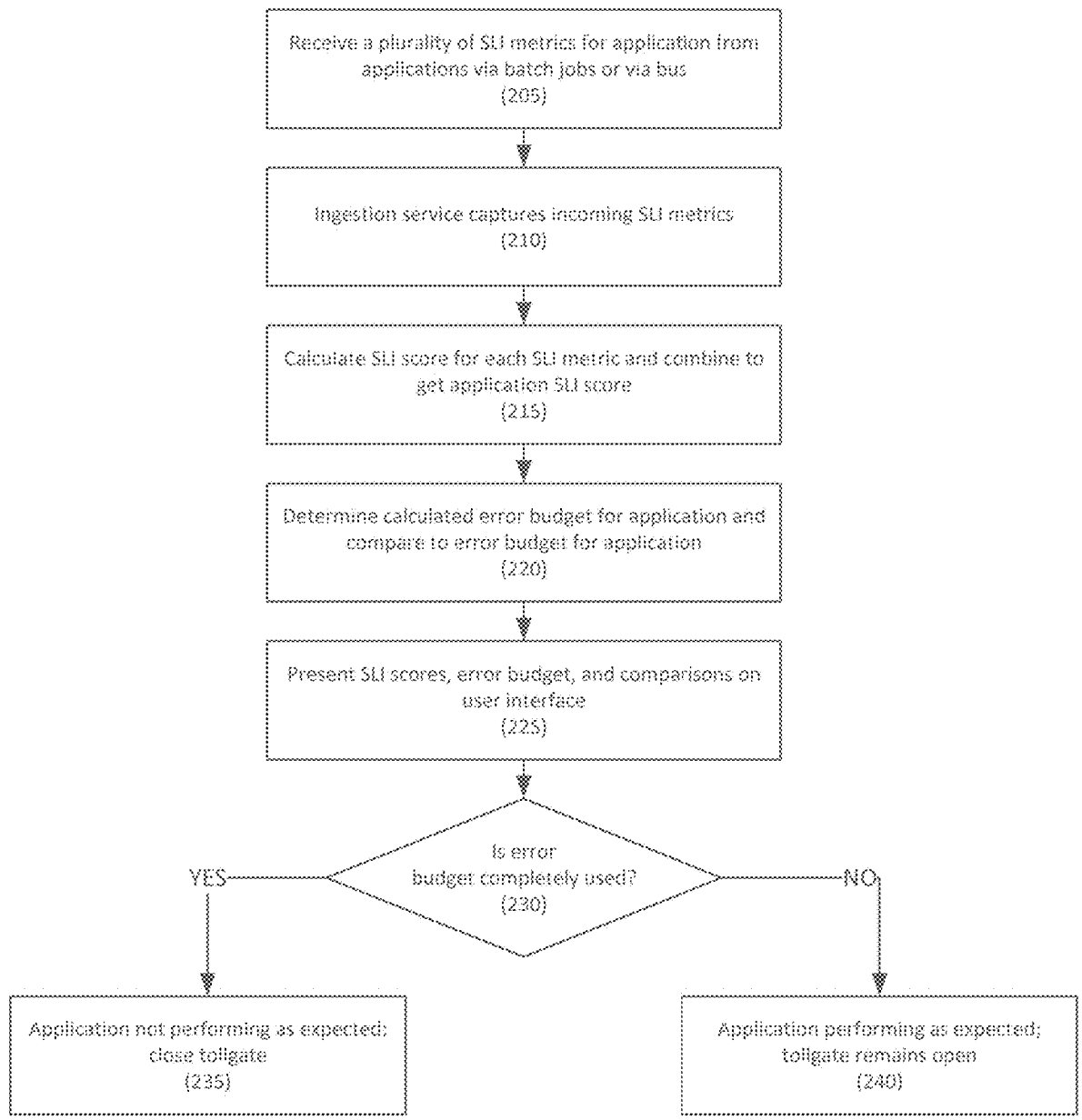
FIG. 2 depicts a method for application operational tracking according to an embodiment.

Referring to FIG. 2, a method for application operational monitoring is provided according to one embodiment.

In step 205, an operational monitoring engine may receive a plurality of SLI metrics for an application directly (e.g., via batch jobs), or by pulling the SLI metrics from a bus (e.g., a Kafka bus) after they are posted to the bus by a monitoring broker application. In one embodiment, the SLI metrics may include synthetic SLI metrics and/or APM/API SLI metrics.

In step 210, an ingestion engine may capture the incoming SLI metrics. For example, the ingestion engine may receive data in an expected format from the monitoring broker application and may normalize and/or transform the data for either posting the raw metrics to the Kafka Bus internally residing within the operational monitoring engine and/or for providing the raw data to a calculation service in the expected format.

In step 215, for each application, or for a plurality of applications, the operational monitoring engine may calculate a SLI score based on the plurality SLI metrics. For example, each SLI score may be calculated as a ratio of the number of successful observations over the total number of observations over a configurable SLI window which may be based on time (e.g., 30 days), number of observations or datapoints (e.g., 500 observations) depending upon the configured weightage.

Once the SLI scores for the SLI metrics are calculated, each SLI score may be weighted based on the user's preferences, machine learning-based weightings, etc. The weighted SLI metrics may then be combined to derive a SLI score for the application.

In step 220, the combined SLI score for the application may be compared to the SLO for the application, which results in a calculated error budget. For example, the difference between the SLI score and the SLO may be considered to be the calculated error budget. The calculated error budget may also be compared to the error budget for the application, which may be received from the application developer, the entity responsible for the application, etc. In another embodiment, the error budget may be determined using machine learning based on the historical calculated error budget for the application and/or other similar applications, a prior calculated error budget for the application, etc.

In step 225, the SLI scores, the calculated error budget, and the comparison(s) may be made available to users via a user interface.

In step 230, if the calculated error budget breaches the error budget for the application, this indicates that the application is not performing as expected, and in step 235, a notification may be provided (e.g., by email, in-app messaging, etc. to registered users). In one embodiment, the operational management engine may implement a restriction (e.g., may close a tollgate) so that the breaching application cannot be enhanced until the error is corrected (e.g., engineer a fix via software development life cycle, develop automation, implement automated recovery, etc.) or the calculated error budget for the application is within an acceptable range.

In one embodiment, the restriction may be provided with an override that allows certain parties (e.g., application owner, CTO, etc.) to modify the application. Examples of allowed modification may include compliance fixes, high-priority tickets, modifications to address potential or actual financial/reputational impacts, etc.).

If the calculated error budget does not breach the error budget for the application (e.g., the error budget is within an acceptable range), this indicates that the application is performing as expected, and in step 240, users may be notified of such. Any restrictions that are implemented may be withdraw (e.g., tollgates are opened), or may remain open, and the application can be enhanced.

In one embodiment, if the calculated error budget does not breach the error budget but is trending toward breaching the error budget, the operational monitoring engine may generate notifications indicating that the error budget is nearly exhausted, trending toward exhaustion, etc. In one embodiment, additional actions, such as implementing restrictions, may be implemented as is necessary and/or desired.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for application operational monitoring, comprising:
ingesting, at an operational monitoring computer program, a plurality of service level indicator (SLI) metrics for an application comprising synthetic SLI metrics and Application Performance Monitoring (APM)/Application Programmable Interface (API) SLI metrics, each SLI metric identifying a number of successful observations and a number of total observations;
calculating, by the operational monitoring computer program, a SLI score for each SLI metric based on the number of successful observations and the number of total observations for the SLI metric;
weighting, by the operational monitoring computer program, the SLI score for each SLI metric;
combining, by the operational monitoring computer program, the weighted SLI scores into an application SLI score;
calculating, by the operational monitoring computer program, a calculated error budget based on the application SLI score;
comparing, by the operational monitoring computer program, the calculated error budget to an error budget for the application;
generating, by the operational monitoring computer program, a notification in response to the comparison;
in response to the calculated error budget breaching the error budget, causing, by the operational monitoring computer program, implementation of a restriction in an integrated deployment toolchain/pipeline for the application, wherein the restriction prevents enhancements to the application and prevents the application from executing further operations; and
in response to the calculated error budget being within the error budget, causing, by the operational monitoring computer program, the restriction to be removed.

2. The method of claim 1, further comprising:
calculating, the operational monitoring computer program, the error budget based on a service level objective (SLO) for the application.

3. The method of claim 2, wherein the error budget is based on the number of total observations.

4. The method of claim 1, wherein the notification comprises a SLO status.

5. The method of claim 1, further comprising:
updating, by the operational monitoring computer program, the error budget based at least one prior calculated error budget for the application.

6. An electronic device, comprising:
a computer processor; and
a memory comprising an operational monitoring computer program;
wherein the operational monitoring computer program is configured to:
ingest a plurality of service level indicator (SLI) metrics for an application comprising synthetic SLI metrics and Application Performance Monitoring (APM)/Application Programmable Interface (API) SLI metrics, each SLI metric identifying a number of successful observations and a number of total observations;
calculate a SLI score for each SLI metric based on the number of successful observations and the number of total observations for the SLI metric;
weight the SLI score for each SLI metric;
combine the weighted SLI scores into an application SLI score;
calculate a calculated error budget based on the application SLI score;
compare the calculated error budget to an error budget for the application;
generate a notification in response to the comparison;
in response to the calculated error budget breaching the error budget, cause implementation of a restriction in an integrated deployment toolchain/pipeline for the application, wherein the restriction prevents enhancements to the application and prevents the application from executing further operations; and
in response to the calculated error budget being within the error budget, cause the restriction to be removed.

7. The electronic device of claim 6, wherein the operational monitoring computer program is further configured to:
calculate the error budget based on a service level objective (SLO) for the application.

8. The electronic device of claim 7, wherein the error budget is based on the number of total observations.

9. The electronic device of claim 6, wherein the notification comprises a SLO status.

10. The electronic device of claim 6, wherein the operational monitoring computer program is further configured to:
update the error budget based on at least one prior calculated error budget for the application.

11. A system, comprising:
an application;
a monitoring broker application that receives plurality of service level indicator (SLI) metrics comprising synthetic SLI metrics and Application Performance Monitoring (APM)/Application Programmable Interface (API) SLI metrics from the application and makes them available on a telemetry bus, each SLI metric identifying a number of successful observations and a number of total observations; and
an operational monitoring engine comprising a computer processor and executing an operational monitoring computer program that receives the plurality of SLI metrics from the telemetry bus and is configured to:
ingest the SLI metrics;
calculate a SLI score for each SLI metric based on the number of successful observations and the number of total observations for the SLI metric;
weight the SLI score for each SLI metric;
combine the weighted SLI scores into an application SLI score;
calculate a calculated error budget based on the application SLI score;
compare the calculated error budget to an error budget for the application;
generate a notification in response to the comparison;
in response to the calculated error budget breaching the error budget, cause implementation of a restriction in an integrated deployment toolchain/pipeline for the application, wherein the restriction prevents enhancements to the application and prevents the application from executing further operations; and in response to the calculated error budget being within the error budget, cause the restriction to be removed.

12. The system of claim 11, wherein the operational monitoring computer program is further configured to calculate the error budget based on a service level objective (SLO) for the application, wherein the error budget is based on the number of total observations.

13. The system of claim 11, wherein the notification comprises a SLO status.

14. The system of claim 11, wherein the operational monitoring computer program is further configured to update the error budget based on at least one prior calculated error budget for the application.

* * * * *